(12) United States Patent
Kaufmann et al.

(10) Patent No.: US 12,531,818 B2
(45) Date of Patent: Jan. 20, 2026

(54) METHOD OF OPERATING A NETWORK

(71) Applicant: HIRSCHMANN AUTOMATION AND CONTROL GMBH, Neckartenzlingen (DE)

(72) Inventors: Arne Kaufmann, Metzingen (DE); Lukas Bechtel, Stuttgart (DE); Rene Hummen, Wendlingen (DE)

(73) Assignee: HIRSCHMANN AUTOMATION AND CONTROL GMBH, Neckartenzlingen (DE)

( * ) Notice: Subject to any disclaimer, the term of this patent is extended or adjusted under 35 U.S.C. 154(b) by 257 days.

(21) Appl. No.: 18/019,915

(22) PCT Filed: Sep. 2, 2021

(86) PCT No.: PCT/EP2021/074224
§ 371 (c)(1),
(2) Date: Mar. 4, 2023

(87) PCT Pub. No.: WO2022/049174
PCT Pub. Date: Mar. 10, 2022

(65) Prior Publication Data
US 2023/0362033 A1    Nov. 9, 2023

(30) Foreign Application Priority Data
Sep. 7, 2020    (DE) .................. 102020123275.6

(51) Int. Cl.
*H04L 49/253*    (2022.01)
*H04L 12/40*    (2006.01)
(Continued)

(52) U.S. Cl.
CPC ............ *H04L 49/254* (2013.01); *H04L 12/40* (2013.01); *H04L 12/4641* (2013.01);
(Continued)

(58) Field of Classification Search
None
See application file for complete search history.

(56) References Cited

U.S. PATENT DOCUMENTS 4,829,541 A  *  5/1989  Brehmer ................. H04L 25/08
                                                    326/60
5,966,372 A  *  10/1999  Wright .................... H04M 3/36
                                                    370/329
(Continued)

FOREIGN PATENT DOCUMENTS

DE    19923569       *  11/2000
EP    3697034 A       8/2020

*Primary Examiner* — Andre Tacdiran
(74) *Attorney, Agent, or Firm* — MH2 Technology Law Group, LLP

(57) ABSTRACT

A method is proposed for operating a network with multiple subscribers in the network. For this purpose, a network having at least one switch (20, 21), at least two terminals (10, 11, 12) and a controller (30) is provided. According to the invention, one of the subscribers now sends and/or receives data to another subscriber via an application protocol, with the data being sent and/or received as a TSN data stream. In order to integrate non-TSN-capable nodes in the network, it is proposed that the TSN data stream be divided into at least two partial data streams (1, 2, 3, 4). Such partial data streams (1, 2, 3, 4) can be configured across non-TSN-capable subscribers or between such subscribers.

11 Claims, 1 Drawing Sheet

(51) Int. Cl.
*H04L 12/46* (2006.01)
*H04L 47/36* (2022.01)

(52) U.S. Cl.
CPC ........ *H04L 12/4645* (2013.01); *H04L 47/365* (2013.01); *H04L 2012/4026* (2013.01)

(56) References Cited

U.S. PATENT DOCUMENTS

| | | |
|---|---|---|
| 11,153,416 B2 | 10/2021 | Goetz |
| 11,296,968 B2 | 4/2022 | Goetz |
| 11,336,657 B2 | 5/2022 | Fischer |
| 11,477,107 B2 | 10/2022 | Fischer |
| 2009/0284653 A1* | 11/2009 | Lee ........................ H04H 60/11 725/118 |
| 2015/0351110 A1* | 12/2015 | Bai ......................... H04L 47/12 370/329 |
| 2017/0081149 A1* | 3/2017 | Dugan ................... H04L 12/417 |
| 2018/0026829 A1* | 1/2018 | Bhatia ................. H04L 41/0213 709/223 |
| 2018/0123733 A1* | 5/2018 | Yang ...................... H04L 1/0052 |
| 2019/0104163 A1* | 4/2019 | Garrido ............... H04L 65/1089 |
| 2020/0092154 A1* | 3/2020 | Kwon .................... H04B 7/022 |
| 2020/0274803 A1* | 8/2020 | Yang .................... H04L 61/2503 |
| 2021/0287666 A1 | 9/2021 | Beckhoff |
| 2021/0392084 A1 | 12/2021 | Akerberg |
| 2022/0353195 A1 | 11/2022 | Wei |

\* cited by examiner

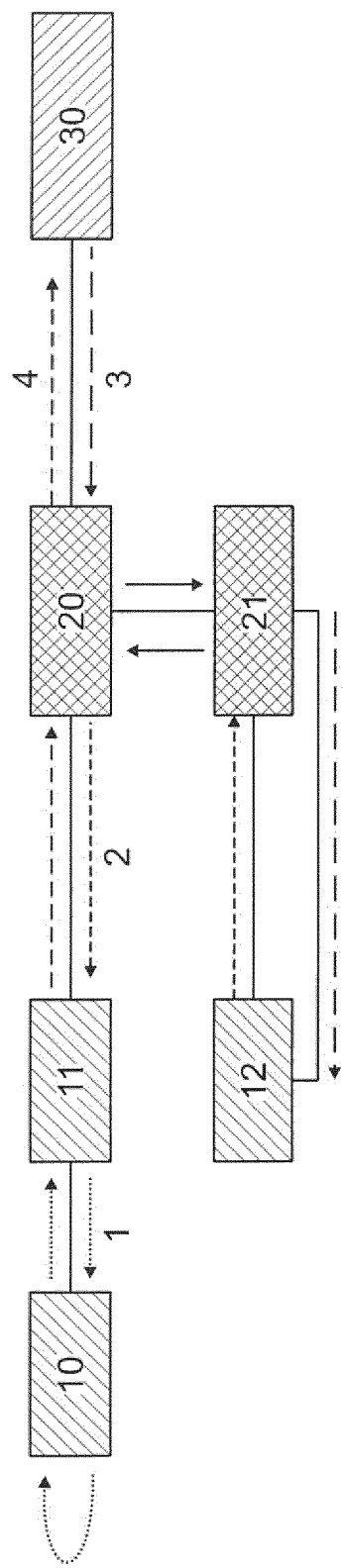

METHOD OF OPERATING A NETWORK

CROSS REFERENCE TO RELATED APPLICATIONS

This application is the US-national stage of PCT application PCT/EP2021/174224 filed 2 Sep. 2021 and claiming the priority of German patent application 102020123275.6 itself filed 7 Sep. 2020.

The present invention relates to a method of operating a network, in particular an automation network.

The method is intended to be usable for integrating components of an automation network into an existing multifunction network, for example into an Ethernet network, in particular into a fieldbus network designed as an Ethernet bus.

In existing automation networks, such as SERCOS III, there is often the restriction that devices of the automation network are the sole users of the network. And although the automation network is also designed as an Ethernet network, it is not trivial to integrate such an automation network into an existing network.

These difficulties consist of restrictions, for example in terms of network topology, that make integration into other networks difficult or impossible.

It should also become possible to integrate automation networks into TSN networks. TSN was developed to enable time-sensitive data transfers in a network. TSN functions also make transmission times predictable. The TSN network is standardized under IEEE 802.1.

A SERCOS III automation network, for example, is based on sum frame telegrams in the form of Ethernet broadcasts without VLAN tag. It therefore requires a specific network topology, such as ring or line topology, with a stable subscriber sequence.

Since the maintenance of such an order cannot be guaranteed when integrating such nodes into an existing Ethernet network according to the IEEE specification, such integration is difficult or impossible. It is also difficult to integrate non-TSN-capable subscribers into a TSN network.

A correspondingly known communication in an automation network is known, for example, from WO 2018/215209 [U.S. Pat. No. 11,336,657]. Here, the devices are mainly connected in a line topology and enabled by corresponding communication through data telegrams.

In order to also provide data nodes in an automation network, for example in order to be able to make the subscriber sequence more variable, a method for transmitting telegrams in an automation network is known from DE 10 2018 129 809 [US 2021/0281666]. However, the topology that connects the devices to the automation network is also fixed here.

WO 2017/093014 [U.S. Pat. No. 11,153,416] also discloses a method for industrial communication via TSN. Here, basic communications and protocols in a TSN-enabled network are disclosed.

Finally, a method for data transmission in a TSN-capable network with nodes is known from EP 3 697 034. The individual nodes enable different TSN streams in the branches of the network.

Thus, the object of the present invention is to integrate an automation network into an existing network and to enable the use of TSN functions even if non-TSN-capable network nodes are present.

This object is attained by the features of the main claim.

A method is thus proposed for operating a network comprising at least one switch. The switch serves as a node in the network and can send or receive data in all directions of the node. Furthermore, the switch includes programmable logic that can store and use the relationships to the other nodes in the network.

Also, the network contains at least two terminals and a controller. The controller is also referred to as the master in an automation network.

According to the invention, the controller can send data to a specific terminal via an application protocol in order to control it. The application protocol is implemented via the application layer of the OSI network model. This means that communication via the application protocol is implemented in OSI layer 7.

In accordance with the specification for Internet networks, the data sent in this way is divided into data packets and sent via the network's link layer. This means that the individual data packets are transmitted within the link layer, i.e. layer 2 of the OSI model. The data packets are thus transmitted in layer 2 as a frame.

According to the invention, the data is sent as a TSN data stream. This means that the data stream of the transmitted and/or received data is provided with time-sensitive features according to IEEE 802.1.

According to the invention, the TSN data stream is now divided into at least two partial data streams that can also be TSN-capable. The aim of this subdivision is to ensure that nodes that are not TSN-capable are present in the network between the individual partial data streams or within the partial data streams. The partial data streams should make it possible to configure TSN functions via nodes that are not TSN-capable. This is achieved, for example, by generating partial data streams up to the non-TSN-capable subscriber and then again after the non-TSN-capable subscriber up to the destination.

Also, it is possible to configure a TSN partial data stream across a non-TSN-capable subscriber, provided that the non-TSN-capable subscriber is not the destination of the communication.

The partial data streams ensure that, when combined, the partial data streams result in a coherent TSN data stream. This means that it is now possible to enable TSN data streams in a network with TSN-capable and non-TSN-capable nodes. This means that any automation network can be integrated into an existing conventional network.

The partial data streams can be dependent on each other. This means, for example, that in the case of two partial data streams, the second partial data stream is not created until the first partial data stream has been processed.

Also, the partial data streams can be dependent on upstream subscribers. This means that a partial data stream could only be created when an upstream subscriber in the data stream is ready.

As already explained, the partial data streams can be designed as TSN partial data streams or as conventional data streams. However, the data stream assembled from the partial data streams is then designed as a TSN data stream.

The switches should be located at the nodes of the networks, preferably between the controller and the terminals. This allows different topologies to be interconnected in a network starting at these nodes.

The terminals of the automation networks can be connected in series, in a ring or in a line, depending on the topology. This also corresponds to the normal function of an automation network. In principle, several automation networks can thus be connected together in a network by the switches so that subscribers who do not belong to the automation network can also be part of the same network.

The method according to the invention includes the step of the terminals also responding according to the automation network and the application protocol, so that the response can be sent from the terminals to the corresponding controller. By using TSN data streams, it is possible to predict when data will be sent and/or received, as well as to prioritize data streams in the network. This makes communication in the network plannable.

Preferably, it is suggested that controller and terminals are parts of an automation bus. This bus is then operated as an automation network with Ethernet specification. The number of controllers and terminals in the network is not limited.

As a special embodiment, it is possible to replace the switches with routers, since routers also contain the functions of a switch. Also, further subscribers such as PCs, servers and/or hubs can be present.

Preferably, it is proposed to configure the controller and/or the switch (or the router) by a network management that is preferably software in order to be able to perform the desired progression of data from a network subscriber to the terminal.

Further features are shown in the attached drawing. Therein:

FIG. 1 is a diagram of a network according to the invention with two switches.

FIG. 1 shows a network according to the invention with three terminals 10, 11, 12, two switches 20, 31 and a controller 30.

The controller 30 and the terminals 10, 11, 12 are taken from an automation network. However, the terminals 10, 11 are included in a different network strand than the terminal 12. The terminals 10, 11 are in a line topology and the terminal 12 in a ring topology.

There may be other network nodes located on the branches of the network, but these are not shown in this FIG. 1.

The branches or different topologies are connected by two switches 20, 21. Accordingly, the switches 20, 21 represent nodes in the network that connect the different branches or topologies.

If the controller 30 now wants to send data for controlling a terminal to, for example, terminal 11, corresponding data is sent to the network via the application protocol. The application protocol is executed in the application layer of the OSI network model.

According to the specifications of an Ethernet network, this data is now divided into data packets and, according to the invention, sent as frames via the link layer (OSI model layer 2).

For this purpose, functions of a TSN network are used and the communication between controller 30 and terminal 11 is executed as a TSN data stream. According to the invention, the data stream is now divided into partial data streams 2, 3. These partial data streams 2, 3 can also be executed as TSN partial data streams.

In this example, the data stream is implemented via two switches 20, 21 and is first executed in partial data stream 3. This partial data stream 3 leads from the controller 30 via switch 20 to switch 21. Subsequently, the partial data stream 3 is fed to the terminal 12.

Then the partial data stream 2 begins, which is fed from terminal 12 via switches 21, 20 to terminal 11. Thus, a TSN data stream is divided into two partial data streams 2, 3.

The response from terminal 11 to controller 30 is also executed as a TSN data stream. The data stream could be divided into partial data streams 1, 2. Partial data stream first passes via terminal 10 back to terminal 11. Partial data stream 2 then begins, which passes via switch 20 to controller 30.

The path taken by the TSN data stream and thus the partial data streams is determined by the time values of the network nodes. The TSN functions can prioritize or plan a path in the network, for example the fastest path to the desired destination.

In the present example, switches 20, 21 might not be TSN-capable, so a split into the partial data streams takes place. This means that the start and destination of each partial data stream is TSN-capable.

The individual partial data streams are dependent on each other. Thus, partial data stream 2 can only be created when partial data stream 3 has at least partially arrived at the terminal 12.

Similarly, partial data stream 2 may be dependent on terminal 12 and may be created only when terminal 12 is ready to do so.

The arrangement and topologies of the strands at the switches 20, 21 are exemplary and can be of any design. Also, the number of terminals 10, 11, 12, switches 20, 21 and controllers 30 is not critical.

By using partial data streams in a TSN network, it is now possible to integrate automation networks into conventional Ethernet networks, even with TSN functions.

The present application is not limited to the previous features. Rather, further embodiments are conceivable. For example, instead of at least one switch, a router or a server could also be used. Also, further subscribers, such as PCs or hubs, could be used.

The invention claimed is:

1. A method of integrating a non time-sensitive network (TSN)-capable node into a network, the network comprising multiple subscribers comprising at least two terminals and a controller, the method comprising the steps of:
   one of the subscribers sending data to and/or receiving data from another of the subscribers via an application protocol,
   sending or receiving the data as a TSN data stream, and
   dividing the TSN data stream into at least two partial data streams,
   wherein sending or receiving the data as the TSN data stream comprises:
      sending a first of the at least two partial data streams from the controller of the network to a first of the at least two terminals of the network via the non TSN-capable node; and
      sending a second of the at least two partial streams from the first of the at least two terminals of the network to a second of the at least two terminals of the network via the non TSN-capable node,
   wherein the non TSN-capable node is a switch.

2. The method according to claim 1, wherein the partial data streams are dependent on a preceding partial data stream in a stream direction.

3. The method according to claim 1, wherein the partial data streams are dependent on an upstream subscriber in a stream direction.

4. The method according to claim 1, wherein the partial data streams also include TSN data streams.

5. The method according to claim 1 wherein the subscribers are connected to the switches in ring or line topology.

6. The method according to claim 1,
wherein a plurality of the terminals are connected in series.

7. The method according to claim 1,
wherein the data streams and partial data streams are divided into data packets and are sent and received within the data link layer.

8. The method according to claim 1,
wherein the switch is a router or a server.

9. The method according to claim 1,
wherein a plurality of controllers are present as subscribers in the network.

10. The method according to claim 1,
wherein the controller and the terminals are parts of an automation bus.

11. The method according to claim 1, further comprising the step of:
configuring the controller and/or the switch by a network management.

* * * * *